(12) United States Patent
Klimek

(10) Patent No.: US 8,172,286 B2
(45) Date of Patent: *May 8, 2012

(54) MOTOR VEHICLE FRONT STRUCTURE

(75) Inventor: Stanislaw Klimek, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,313

(22) Filed: Feb. 4, 2011

(65) Prior Publication Data

US 2011/0193371 A1   Aug. 11, 2011

(30) Foreign Application Priority Data

Feb. 5, 2010   (DE) .......................... 10 2010 006 977

(51) Int. Cl.
  *B60R 19/02* (2006.01)
  *B60R 19/12* (2006.01)
(52) U.S. Cl. ..................... 293/133; 293/146; 293/154
(58) Field of Classification Search ............. 296/187.09; 293/102, 132, 133, 146, 148, 154, 155
  See application file for complete search history.

(56) References Cited

U.S. PATENT DOCUMENTS

| | | | |
|---|---|---|---|
| 3,774,950 A | 11/1973 | Weller | |
| 4,413,856 A | 11/1983 | McMahan et al. | |
| 5,611,568 A * | 3/1997 | Masuda | 280/784 |
| 6,957,846 B2 * | 10/2005 | Saeki | 296/187.1 |
| 7,000,975 B2 | 2/2006 | Haneda et al. | |
| 7,044,516 B2 | 5/2006 | Kobayashi et al. | |
| 2008/0023972 A1 * | 1/2008 | Ohno et al. | 293/155 |
| 2009/0140546 A1 * | 6/2009 | Okabe et al. | 296/187.09 |
| 2009/0200811 A1 | 8/2009 | Erzgraeber et al. | |
| 2011/0109122 A1 * | 5/2011 | Clausen et al. | 296/187.03 |

FOREIGN PATENT DOCUMENTS

| | | |
|---|---|---|
| AU | 2002358415 B2 | 4/2008 |
| DE | 4040459 A1 | 6/1992 |
| DE | 102004056956 A1 | 7/2005 |
| EP | 0894675 A1 | 2/1999 |
| EP | 0908356 A1 | 4/1999 |
| EP | 1688312 A1 | 8/2006 |
| EP | 2156990 A1 | 2/2010 |
| GB | 281865 A | 12/1927 |
| GB | 1397757 A | 6/1975 |
| WO | 2006103326 A1 | 10/2006 |

OTHER PUBLICATIONS

Machine Translation of EP 0908356, printed from the EPO website, Jun. 15, 2011.*
British Patent Office, British Search Report for British Application No. 1101351.3, dated Apr. 15, 2011.
German Patent Office, German Search Report for German Application No. 102010006975.2, Oct. 15, 2010.

* cited by examiner

*Primary Examiner* — Jason S Morrow
(74) *Attorney, Agent, or Firm* — Ingrassia Fisher & Lorenz, P.C.

(57) ABSTRACT

A motor vehicle front structure is provided with at least one front frame having two side members and an impact cross member structure. Two crash boxes are fixed between the respective front end of the side members and the impact cross member structure. Each of the crash boxes includes, but is not limited to a first and a second leg that are jointly fixed to the front end of each side member and in the shape of a V in the direction of the impact cross member structure turn into ends spread from each other The spread ends are fixed on end regions of the impact cross member structure.

18 Claims, 4 Drawing Sheets

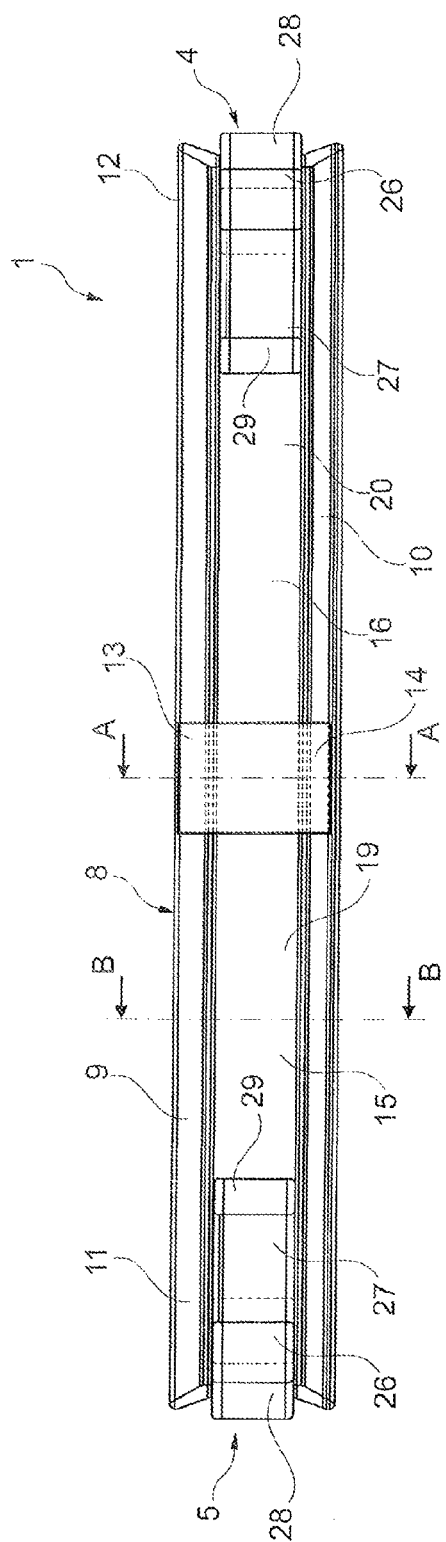
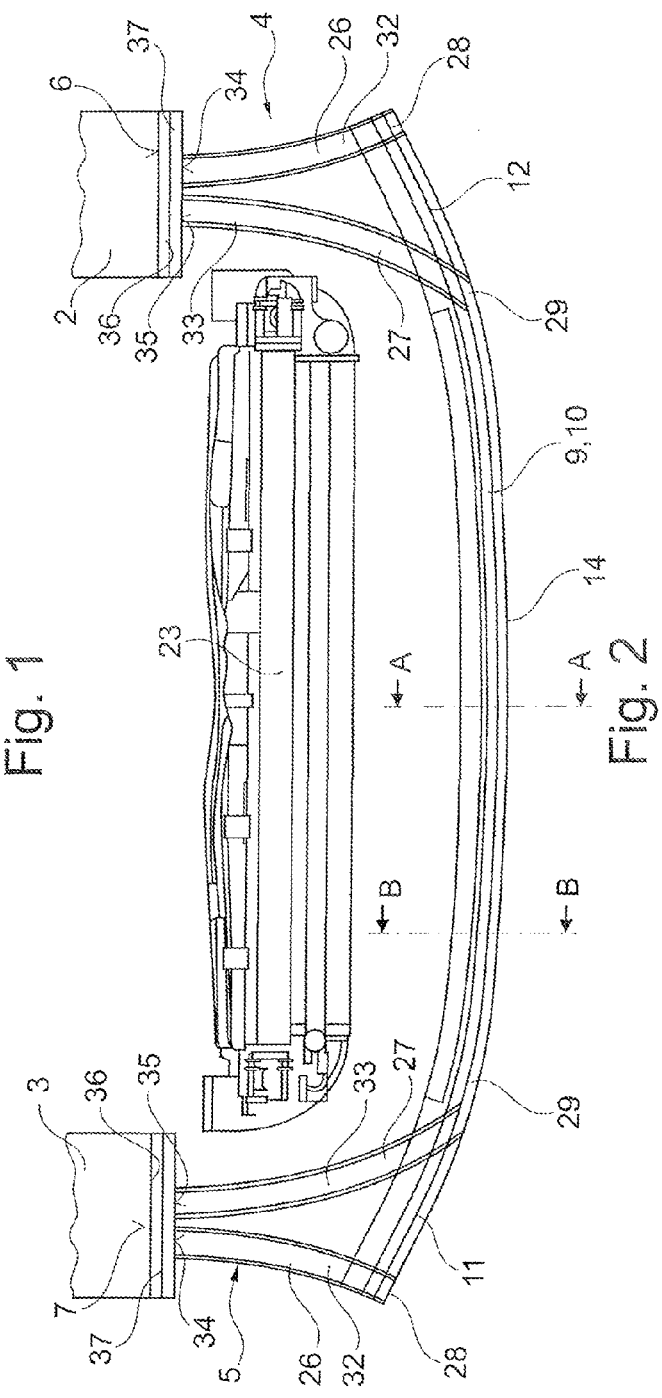

MOTOR VEHICLE FRONT STRUCTURE

CROSS REFERENCE TO RELATED APPLICATION

This application claims priority to German Patent Application No. DE 102010006977.9 filed Feb. 5, 2010, which is incorporated herein by reference in its entirety.

TECHNICAL FIELD

The technical field relates to a motor vehicle front structure with at least one front frame with two side members and one impact cross member structure. Two crash boxes are fixed between the respective front end of the side members and the impact cross member structure.

BACKGROUND

Crash boxes are employed with motor vehicles for increasing the safety. In addition, damages to the body structure of the vehicle can be reduced in the event of accidents at low speed through the use of these crash boxes. To this end, the crash boxes are designed as deformation bodies which are so installed in the motor vehicle that in the event of an impact of the motor vehicle against an obstacle they partially absorb the occurring impact energy through their deformation. Because of this, the crash boxes prevent the transmission of the impact energy to the body structure, particularly to the two vehicle side members and can thus reduce or entirely prevent that these are damaged.

Such a vehicle front structure with crash boxes is known from the publication US 2009/0200811 A1. In this regard, the known motor vehicle front structure comprises a bumper system with a transverse bumper component that is arranged on a stiff frame, a yielding bumper envelope, a compressible structure, which is arranged between an upper region of the envelope and the transverse bumper component and a support section supporting in the lower region of the envelope, which together with a crash box, which supports the transverse bumper component, is fixed on an anchor plate of the stiff frame.

Such a known motor vehicle front structure is shown in a schematic perspective view in FIG. 6. With this prior art, crash boxes 4 and 5, which are connected via an impact cross member 9, are arranged on two vehicle side members 2 and 3 of a vehicle front frame 1 via an anchor plate 37 at the front ends 6 and 7 of the vehicle side members 2 and 3.

Such a motor vehicle front structure has the disadvantage of a relatively extended overhang because of the extended crash boxes. Apart from this, these crash boxes offer energy absorption in the event of a frontal impact but this energy absorption is significantly reduced when the impact has a lateral component since the crash boxes are then merely subjected to shearing stress load and are bent laterally without major energy absorption.

In view of the foregoing, at least one object is to state a motor vehicle front structure which with safety characteristics that remain the same, particularly in the case of accidents at low speed, has an improved and shortened construction and a reduced weight. In addition, other objects, desirable features and characteristics will become apparent from the subsequent summary and detailed description, and the appended claims, taken in conjunction with the accompanying drawings and this background.

SUMMARY

A motor vehicle front structure is provided with at least one front frame with two side members and an impact cross member structure is created. Two crash boxes are fixed between the respective front end of the side members and the impact cross member structure. Each of the crash boxes comprises a first and a second leg, which are jointly fixed on the front end of each of the side members and in the shape of a V in the direction of the impact cross member structure turn into ends spread from each other. The spread ends are fixed on end regions of the impact cross member structure.

The construction of the crash boxes of two legs, which, starting out from a front frame, diverge, so that the outer leg bends to the outside and the inner leg bends to the inside has the advantage that a best possible protection is provided when the impact not only occurs frontally, but substantially from the side. In addition, the bending of an inner leg brings about a shortening of the distance between the side members of the front frame and the impact cross member structure so that the overhang can be shortened. In addition to this, the spreading of the crash boxes into V-shaped legs brings about an increase of the flexural stiffness of the impact cross member structure and through the spreading of the inner legs an earlier load transfer to the crash boxes themselves can take place. In addition, the deformation region of the impact cross member structure is significantly reduced because of the now four regions for the introduction of the impact energy into the V-shaped crash boxes distributed over the impact cross member structure. The protection of the engine compartment units is thus better protected from damages as well.

In an embodiment the legs form an arc of a circle. There, the first leg is bent to the outside in the form of an arc of a circle and the second leg bent to the inside in the form of an arc of a circle with respect to the impact cross member structure. This bending in the form of an arc of a circle improves the introduction of the impact energy into the crash boxes and simultaneously ensures that the support regions of the impact cross member structure provided by the new crash boxes are more evenly transferred to a lower and an upper impact cross member.

The legs of the V-shaped crash boxes can comprise a closed oval tube profile or a closed rectangular profile. In addition it is possible that each of the legs has a U-shaped profile which is filled up with honeycomb energy-absorbing structures. Here, the legs can be jointly insertable with a rear end each in a hollow profile of the front ends of the side members and releasably fixed. On the other hand it is also possible that the legs are jointly connected materially to an anchor plate with an end each and releasably fixed on an anchor plate of the front ends of the side members. Thus, standard crash boxes with legs spread in the shape of a V can be provided for various vehicle modules. In the ends spread in the shape of a V these crash boxes can comprise a connecting web so that the assembly can be simplified for example through screwing to the impact cross member structure. On the other hand, it is also possible to materially connect the spread ends to the cross member structure through welding or brazing.

In a further embodiment the impact cross member structure has two impact cross members. A first impact cross member and a second impact cross member are arranged above the crash boxes and below the crash boxes respectively, wherein the crash boxes in a left and a right end region of the impact cross member structure are fixed on the impact cross members through material connection.

Such a vehicle front structure has the advantage that on the one hand through the lower second impact cross member the influence region of the crash boxes with respect to the vehicle wheels is located lower than to date. A further advantage consists in that through the division of the impact cross member structure into two impact cross members a significant weight saving for the vehicle front structure is made possible. Furthermore it is an advantage that through the division of the impact cross member structure into two impact cross members an intermediate space between the lower and the upper impact cross member, which makes possible an improved cooling function of the cooling unit of the motor vehicle arranged downstream in driving direction, is created.

In a further embodiment a stiffening plate is arranged in a metal region between the impact cross members. This stiffening plate forms a spacing area between the impact cross members and divides the intermediate space between the impact cross members into a left and a right cooling air passage. Thus, two effects of this stiffening plate are obtained, on the one hand it can ensure that impact energy introduced in the middle is redirected to the right and the left end region of the cross beam structure and introduced into the crash boxes and on the other hand the cooling air flow via the left and the right cooling air inlet is advantageously directed to the radiator of the vehicle arranged downstream in driving direction.

To this end, the impact cross members have a closed oval-shaped hollow profile in contrast with the rectangular hollow profile from the above-mentioned prior art. This closed oval-shaped hollow profile also improves the onflow of cooling air to the radiator of the vehicle. In addition, this closed oval-shaped hollow profile can also be achieved through a cost-effective forming of a tube profile, which significantly reduces the costs compared with the impact cross member according to the prior art.

In addition, it is provided that a longitudinal axis of the hollow profile of the first impact cross member is obliquely inclined downwards towards the interior of the vehicle and a longitudinal axis of the hollow profile of the second impact cross member is obliquely inclined upwards towards the interior of the vehicle. This produces a flow-favourable jet which intensifies the cooling stream to the cooling unit.

This can be additionally intensified in that the closed oval-shaped hollow profile of the two impact cross members opposite the front side has a conically increasing cross section. In addition, this conically increasing cross section is utilized in order to provide a larger connecting area between the impact cross members and the V-shaped crash boxes fixed in their end regions between the two impact cross members. Fixing the V-shaped crash boxes as already mentioned above is effected through a welded connection, through brazing or through a screw or rivet connection with the help of an anchor plate on which the spread-open ends of the crash boxes are fixed.

Thus, with the crash boxes, a weight reduction of the impact cross members as well as short distances between the crash boxes on the impact cross member is achieved. In addition to this, a shortened overhang is possible with high crash effectiveness and can result in a global front structure which, interchangeable and standardized, can be installed as energy absorber component in different vehicle types.

BRIEF DESCRIPTION OF THE DRAWINGS

The present invention will hereinafter be described in conjunction with the following drawing figures, wherein like numerals denote like elements, and:

FIG. 1 shows a schematic front view of a motor vehicle front structure of an embodiment;

FIG. 2 shows a schematic top view of motor vehicle front structure according to FIG. 1;

DETAILED DESCRIPTION

Figure 3:
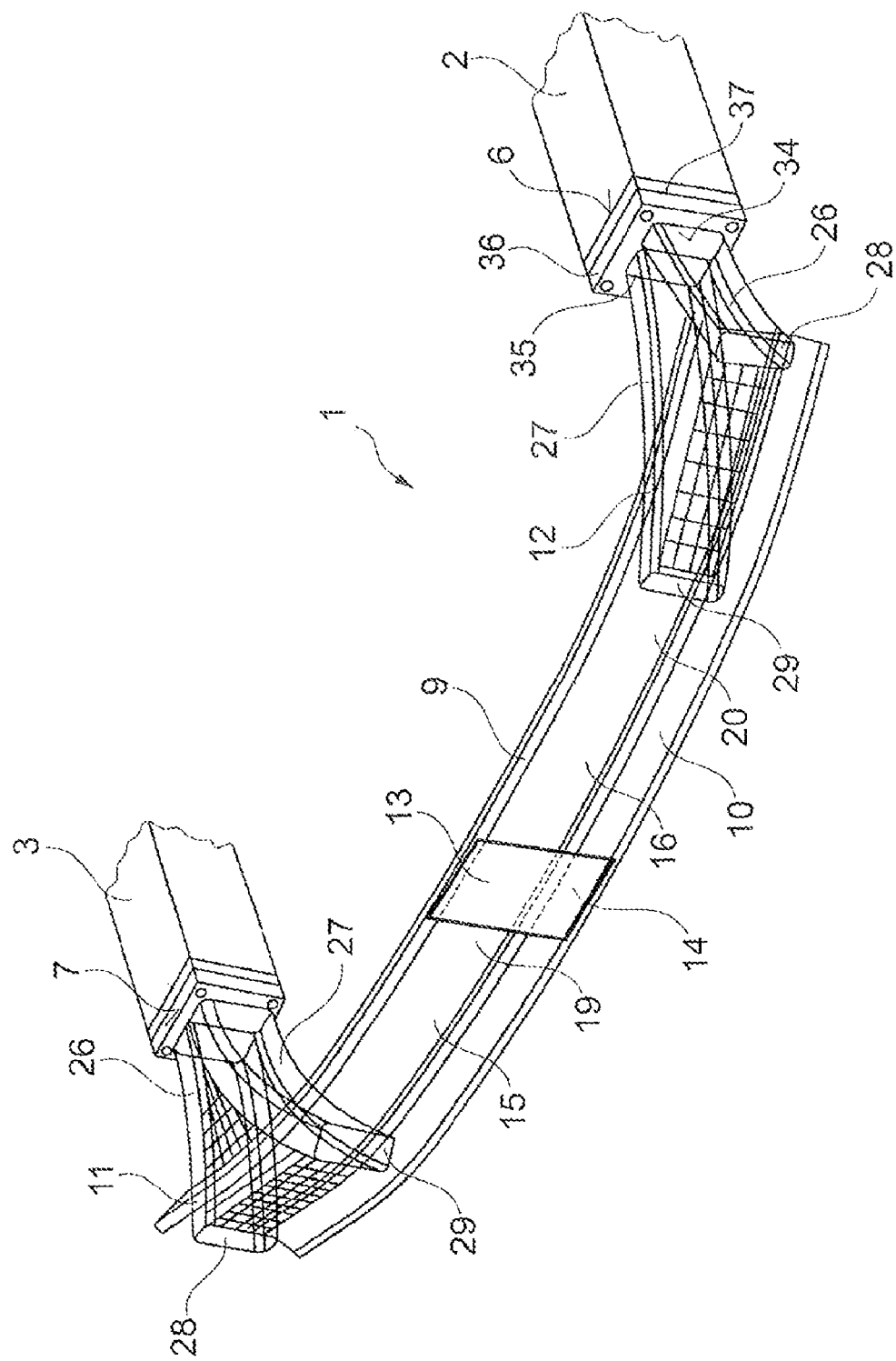
FIG. 3 shows a schematic perspective view of an impact cross member structure according to FIG. 1.

The following detailed description is merely exemplary in nature and is not intended to limit application and uses. Furthermore, there is no intention to be bound by any theory presented in the preceding background or summary or the following detailed description.

FIG. 1 shows a schematic front view of a motor vehicle front structure 1 according to an embodiment. To this end, merely the front impact structure for crash requirements is shown of the motor vehicle front structure 1. All other front structures such as shock absorber facings, cooling air louvers and other design structures have been omitted here. The schematic front view shown in FIG. 1 merely shows an impact cross member structure 8 that is constructed as impact or bumper structure. In contrast with the prior art shown above, the impact cross member structure is fixed on two crash boxes 4 and 5, wherein these crash boxes 4 and 5 divide into legs spreading open in the shape of a V with a first outer leg 26 and a second inner leg 27, thus supporting the impact cross member structure 8 in four regions. This becomes even clearer through the top view of the crash box structure shown in FIG. 2.

FIG. 1 additionally shows that the impact cross member structure 8 is constructed of an upper first impact cross member 9 and a lower second impact cross member 10. In this front view of FIG. 1 a stiffening plate 14 is additionally shown in the middle region 13 of the impact cross member structure 8. This stiffening plate 14 is to transmit the impact energy in a head-on collision to the two V-shaped crash boxes 4 and 5 via the impact cross members 9 and 10.

In this front view a stiffening plate 14 is additionally shown in the middle region 13 of the impact cross member structure 8. This stiffening plate 14 is to transmit the impact energy in a head-on collision to the V-shaped crash boxes 4 and 5 via the two impact cross members 9 and 10. This stiffening plate 14 additionally divides the intermediate space between the impact cross member 9 and the impact cross member 10 into a left cooling air passage 16 and a right cooling air passage 15, so that the cooling air supply to a radiator shown in the next figure is improved. To this end, the next FIG. 2 shows both the shaping of the two impact cross members 9 and 10 as well as the crash boxes 4 and 5 spread in the shape of a V.

FIG. 2 shows a schematic top view of the motor vehicle front structure. The body and engine components have been omitted in this top view and merely the outlines of the radiator structure 23 with the surrounding components of a front impact structure are visible. The lower and upper impact cross members 9 and 10 shown in FIG. 1 form a lightly curved arc from an end region 11 to another end region 12. This curved structure makes it possible that impact forces, which for example impact the stiffening plate 14 in the middle, are transmitted to crash boxes 4 and 5 through the relatively stiff impact cross members 9 and 10 respectively.

The crash boxes 4 and 5 in turn each consist of a first outer leg 26 and a second inner leg 27 and in the direction of the impact cross member structure 8 each have an outer spread end 28 and an inner spread end 29. In addition, the crash boxes 4 and 5 structured in the shape of a V form lower ends 34 and 35 of their legs which in each case jointly turn into a side member of the vehicle. The side members 2 and 3 to this end can comprise anchor plates 37 on which the legs 26 and 27 are fixed with anchor plates 36. In addition it is possible that the common rear ends 34 and 35 of the legs 26 and 27 can be inserted and fixed in corresponding hollow profiles of the front ends of the side members 2 and 3. FIG. 3 shows a schematic perspective view of an impact cross member structure 8 with the V-shaped crash boxes 4 and 5 arranged in end regions 11 and 12. There it is clearly visible that the spread-open ends 28 and 29 of these crash boxes 4 and 5 respectively are fixed between a first upper impact cross member 9 and a second lower impact cross member 10, so that between the impact cross members 9 and 10 a right cooling air passage 15 and a left cooling air passage 16 are created, which are separated by the above-mentioned reinforcement plate 14.

Figure 4:
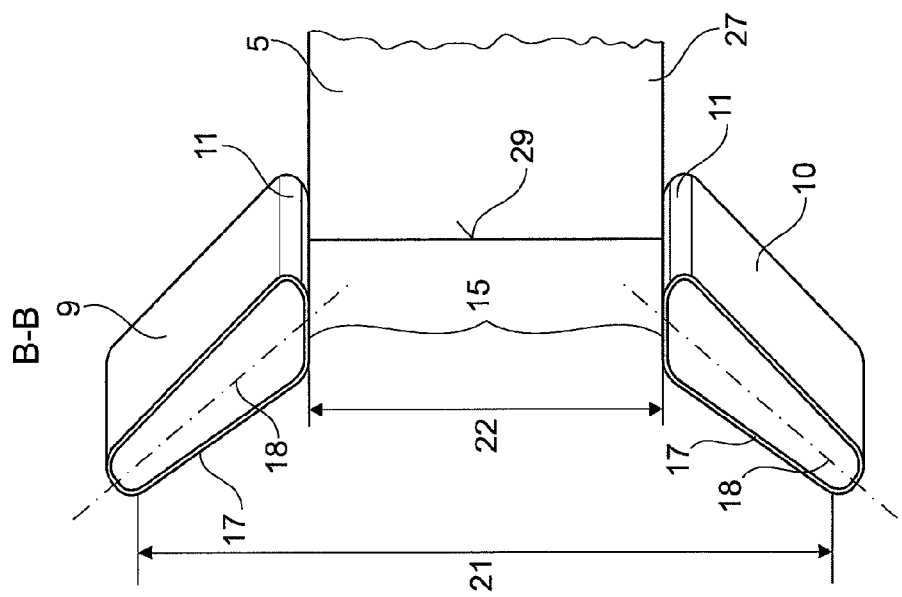
FIG. 4 shows a schematic cross section through an impact cross member structure along the section line B-B according to FIG. 1.
Figure 6:
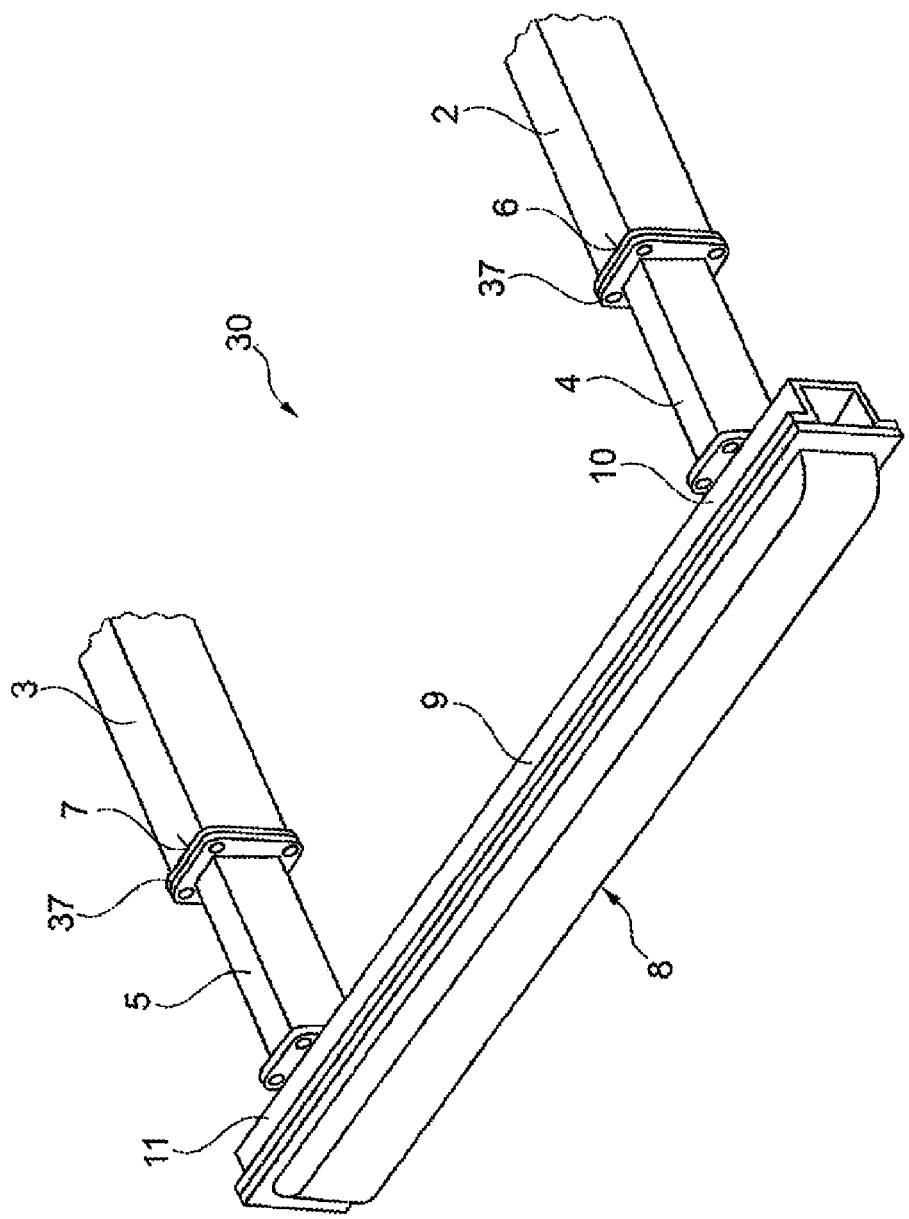
FIG. 6 shows a schematic perspective view of a motor vehicle front structure according to the prior art.

FIG. 4 shows a schematic cross section through an impact cross member structure 8 according to FIG. 3 along the section line B-B. This cross section shows the oval profile of the first upper impact cross member 9 and the second lower impact cross member 10. The longitudinal axes 18 of the impact cross members 9 and 10 respectively are oriented obliquely relative to each other so that the inlet cross section 21 is clearly larger than the outlet cross section 22 in the direction of the radiator shown in FIG. 2. Because of this, the impact cross members 9 and 10 act as nozzles for the cooling air stream, so that the radiator can be subjected to more intensive onflow via the cooling air passages 15 and 16 as they are shown in the FIG. 1 and FIG. 3. In addition, the oval-shaped hollow profile 17 of the impact cross members 9 and 10 starting from the front side has a conically increasing cross section. This conically increasing cross section finally supports the attachment of the V-shaped crash boxes 4 and 5 shown in the FIG. 1 and FIG. 3 with their connecting structures 40 between the impact cross members 9 and 10.

Figure 5:
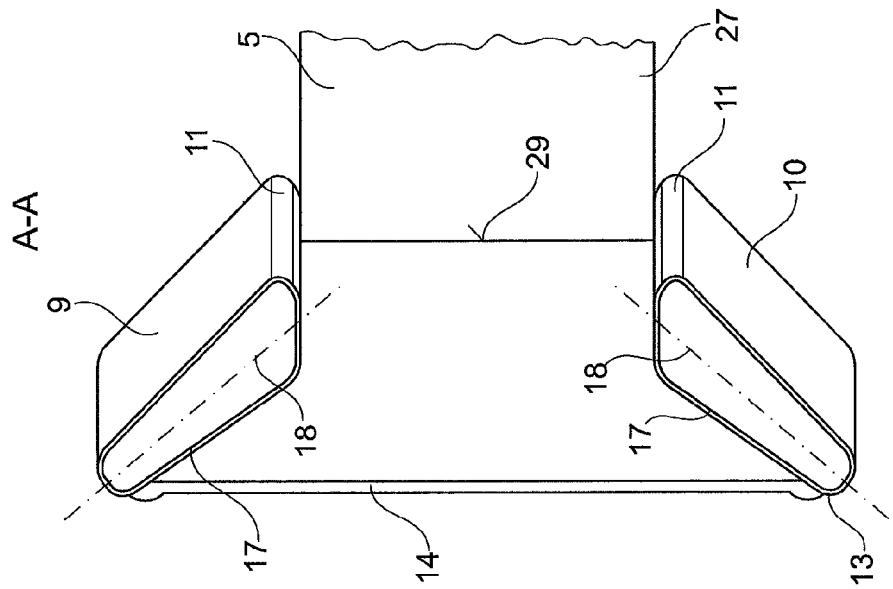
FIG. 5 shows a schematic cross section through an impact cross member structure along the section line A-A according to FIG. 1.

FIG. 5 shows a schematic cross section through an impact cross member structure 8 along the section line A-A according to FIG. 1. In this region, as already mentioned above, a stiffening plate 14 is arranged, which on the front side is fixed to the impact cross members 9 and 10 through welding or brazing. This stiffening plate 14 is solid and has a minimum thickness in this embodiment of the application of approximately 100 mm. While the crash boxes 4 and 5 can preferentially consist of honeycomb plastic regions in the interior and comprise a yielding envelope, the impact cross beam structure is constructed of a high-tensile and break proof metal or aluminium alloy. In addition, stiffening elements can be arranged between the V-shaped legs of the crash boxes 4 and 5 in order to further improve the properties of the energy absorber.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front structure for a motor vehicle, comprising:
   at least one front frame with two side members and an impact cross member structure; and
   at least two crash boxes fixed between a front end of the two side members and the impact cross member structure, each of the at least two crash boxes comprising a first leg and a second leg jointly fixed on an end of each of the two side members and V shaped in a direction of the impact cross member structure and turn into spread ends fixed to end regions of the impact cross member structure;
   wherein the impact cross member structure includes a first impact cross member and a second impact cross member; and
   wherein the first impact cross member is arranged above the at least two crash boxes and the second impact cross member is arranged below the at least two crash boxes.

2. The front structure according to claim 1,
   wherein the first leg and the second leg form an arc of a semi-circle,
   wherein the first leg is bent to an outside and the second leg is bent to an inside with respect to the impact cross member structure.

3. The front structure according to claim 1, wherein the first leg comprises a closed oval tube profile.

4. The front structure according to claim 1, wherein the second leg comprises a closed oval tube profile.

5. The front structure according to claim 1, wherein the first leg and the second leg has a closed rectangular hollow profile.

6. The front structure according to claim 1, wherein the first leg and the second leg has a U-profile.

7. The front structure according to claim 1, wherein the first leg and the second leg each comprises a rear end adapted to be jointly inserted in a hollow profile of front ends of the two side members and are releasably fixed.

8. The front structure according to claim 1, wherein the first leg and the second leg each comprise an end jointly mounted on an anchor plate in a materially connected manner and are releasably fixed on an anchor plate of the front end of the two side members.

9. A front structure for a motor vehicle, comprising:
   at least one front frame with two side members and an impact cross member structure; and
   at least two crash boxes fixed between a front end of the two side members and the impact cross member structure, each of the at least two crash boxes comprising a first leg and a second leg jointly fixed on an end of each of the two side members and V shaped in a direction of the impact cross member structure and turn into spread ends fixed to end regions of the impact cross member structure;
   wherein the impact cross member structure comprises two impact cross members,
   wherein a first impact cross member is arranged above the at least two crash boxes,
   wherein a second impact cross member is arranged below the at least two crash boxes, and
   wherein the at least two crash boxes are materially fixed on the two impact cross members in a left end region and a right end region of the impact cross member structure.

10. The front structure according to claim 9, further comprising a stiffening plate fixed in a middle region between the first impact cross member and the second impact cross member, which divides a spacing area between the first impact cross member and the second impact cross member into a left cooling air passage and a right cooling air passage.

11. The front structure according to claim 9, wherein the first impact cross member has a closed oval-shaped hollow profile.

12. The front structure according to claim 9, wherein the second impact cross member has a closed oval-shaped hollow profile.

13. The front structure according to claim 11, wherein a longitudinal axis of the closed oval-shaped hollow profile of the first impact cross member is inclined obliquely downwards and towards an interior of the motor vehicle.

14. The front structure according to claim 12, wherein a longitudinal axis of the closed oval-shaped hollow profile of the second impact cross member is inclined obliquely upwards and towards an interior of the motor vehicle.

15. The front structure according to claim 11, wherein the closed oval-shaped hollow profile of the first impact cross member opposite a front side has a conically increasing cross section.

16. The front structure according to claim 12, wherein the closed oval-shaped hollow profile of the second impact cross member opposite a front side has a conically increasing cross section.

17. The front structure according to claim 1, wherein the at least two crash boxes are materially fixed on the two impact cross members in a left end region and a right end region of the impact cross member structure.

18. The front structure according to claim 17, further comprising a stiffening plate fixed in a middle region between the first impact cross member and the second impact cross member, which divides a spacing area between the first impact cross member and the second impact cross member into a left cooling air passage and a right cooling air passage.

* * * * *